United States Patent
Hatter et al.

(10) Patent No.: US 8,190,904 B2
(45) Date of Patent: May 29, 2012

(54) SYSTEM FOR EXECUTING REMOTE ELECTRONIC NOTARIZATION AND SIGNATORY VERIFICATION AND AUTHENTICATION

(76) Inventors: Jesse Andrew Hatter, Corona, CA (US); Brenda Fate Hatter, Corona, CA (US); Audrella Marie Jackson, Corona, CA (US)

( * ) Notice: Subject to any disclaimer, the term of this patent is extended or adjusted under 35 U.S.C. 154(b) by 0 days.

(21) Appl. No.: 12/554,735

(22) Filed: Sep. 4, 2009

(65) Prior Publication Data

US 2009/0327144 A1  Dec. 31, 2009

(51) Int. Cl.
  *H04L 29/06* (2006.01)
(52) U.S. Cl. ........................................................ 713/178
(58) Field of Classification Search .................. 713/178
  See application file for complete search history.

(56) References Cited

U.S. PATENT DOCUMENTS

| | | | |
|---|---|---|---|
| 4,731,840 A | 3/1988 | Mniszewski et al. | |
| 5,195,133 A | 3/1993 | Kapp et al. | |
| 5,321,237 A * | 6/1994 | Solimine et al. ............... | 235/375 |
| 5,712,914 A | 1/1998 | Aucsmith et al. | |
| 5,872,848 A | 2/1999 | Romnet et al. | |
| 6,064,751 A | 5/2000 | Smithies et al. | |
| 6,317,777 B1 | 11/2001 | Skarbo et al. | |
| 6,496,851 B1 | 12/2002 | Morris et al. | |
| 6,904,416 B2 | 6/2005 | Nassiri | |
| 6,948,066 B2 | 9/2005 | Hind et al. | |
| 7,028,184 B2 | 4/2006 | Hind et al. | |
| 7,039,189 B1 * | 5/2006 | Kienzle et al. ................. | 380/239 |
| 7,096,005 B2 | 8/2006 | Lai et al. | |
| 7,130,452 B2 | 10/2006 | Bolle et al. | |
| 7,162,635 B2 | 1/2007 | Bisbee et al. | |
| 7,181,017 B1 | 2/2007 | Nagel et al. | |
| 7,194,618 B1 | 3/2007 | Suominen | |
| 7,934,098 B1 * | 4/2011 | Hahn et al. ..................... | 713/176 |
| 2001/0002485 A1 | 5/2001 | Bisbee et al. | |
| 2002/0023220 A1 | 2/2002 | Kaplan | |
| 2002/0038290 A1 * | 3/2002 | Cochran et al. ................. | 705/50 |
| 2002/0042879 A1 | 4/2002 | Gould et al. | |
| 2002/0143711 A1 * | 10/2002 | Nassiri ............................ | 705/76 |
| 2002/0156850 A1 | 10/2002 | Hamscher et al. | |
| 2003/0070072 A1 * | 4/2003 | Nassiri ........................... | 713/168 |
| 2004/0221162 A1 * | 11/2004 | Kongtcheu ..................... | 713/178 |
| 2005/0044369 A1 | 2/2005 | Anantharaman | |
| 2005/0125656 A1 * | 6/2005 | Mallal et al. .................... | 713/156 |
| 2005/0138382 A1 * | 6/2005 | Hougaard et al. ............. | 713/176 |
| 2006/0161779 A1 * | 7/2006 | Geoffrey ........................ | 713/176 |
| 2006/0193004 A1 * | 8/2006 | Wasilewski et al. ........... | 358/1.15 |
| 2007/0174629 A1 | 7/2007 | Suominen | |
| 2007/0206248 A1 * | 9/2007 | Winterbottom et al. ........... | 359/2 |
| 2008/0028455 A1 * | 1/2008 | Hatter et al. .................... | 726/10 |
| 2008/0104408 A1 * | 5/2008 | Mayer ............................ | 713/178 |
| 2008/0209516 A1 * | 8/2008 | Nassiri .............................. | 726/3 |

* cited by examiner

*Primary Examiner* — Michael S McNally (74) *Attorney, Agent, or Firm* — Kirk A. Buhler; Buhler & Associates (57) ABSTRACT

A remote electronic notarization system for remote electronic verification, authentication and screening of potential signatories for remote electronic notary transactions via a remote pc encrypted platform that communicates over a digital broadband or WIFI cellular/PDA device or portable pc device is presented in this disclosure. The system implements electronic components including electronic signature devices, digital certificates, electronic documents, electronic biometric devices, electronic audio/visual software/hardware, electronic payment systems and devices for human interface and verification. The electronic components are electronically synchronized to allow remote notary publics to execute remote electronic notary transactions via a satellite kiosk network or an on-line virtual kiosk application.

17 Claims, 10 Drawing Sheets

$$\left\{\begin{array}{llllll} A\ . & B\ , & C\ ,,, & D\ ,,,, & E\ : & F\ :: \\ G\ ,. & H\ :::: & I\ .. & J\ ,, & K\ ... & L\ .... \\ M\ ::: & N\ \backslash. & O\ ,.., & P\ ,,. & Q\ .., & R\ \backslash \\ S\ ,.,. & T\ | & U\ || & V\ ../ & W\ \backslash.. & X\ ..// \\ Y\ \backslash./ & Z\ / & 0\ ) & 1\ ! & 2\ \_ & 3\ ..- \\ 4\ -.. & 5\ .- & 6\ ( & 7\ -. & 8\ \& & 9\ ? \end{array}\right\}$$

SYSTEM FOR EXECUTING REMOTE ELECTRONIC NOTARIZATION AND SIGNATORY VERIFICATION AND AUTHENTICATION

CROSS REFERENCE TO RELATED APPLICATION

This application is a continuation in part of Utility application Ser. No. 11/880,618 filed Jul. 23, 2007 that issued on Sep. 15, 2009 as U.S. Pat. No. 7,590,852 and Provisional application 60/964,873 filed on Aug. 16, 2007 the entire contents of which is hereby expressly incorporated by reference herein.

FIELD OF THE INVENTION

This invention relates to a system invention is designed to provide a system for a secure network platform that augments an environment of servers, satellite kiosk and on-line virtual kiosk application, COM-linked to telecommunication devices in providing screening/verification, signature authentication, record biometric data, record live audio/video streams of potential signatories interface/interlink with a third party payor system for the processing of remote electronic notary public compensation. The highlight of this invention is the function of the system, to deploy and electronically embed the electronic signature via proprietary steganography software, providing an "Electronic DNA" for the entire remote electronic notary transaction. Enhanced resolution of the electronic signature will reveal this electronic embedding for future signatory and notary digital signature authentication and verification. This proprietary steganography software contains a function of data extrapolation of embedding, providing not only the unique authentication and verification of the electronic signatures of the notary and Signatory, yet creating a basis for electronic forgery prevention and through date/time stamp technology systematized to this art, prohibits unauthorized electronic manipulation of these signatures within the scope of this art.

BACKGROUND OF THE INVENTION

The primary function of this system invention is to interface/interlink human legal activity with electronic and biometric computer components to execute remote electronic notarization via satellite network kiosk or on-line web application. In the Bible there are two scriptures that distinctly describe the manner in which the background of this invention will be explained. According to the King James Version of the Bible, in the Book entitle the First epistle of John or more colloquially known as I John, chapter five versus seven and eight, it reads, "For there are three that bear record in heaven, the Father, the Word, and the Holy Ghost: and these three are one."; and "And there are three that bear witness in earth, the Spirit, and the water, and the blood: and these three agree in one." These two scriptures highlight a central theme that causes cooperation and agreement; bringing together, both record and witness into one. Therefore the aforementioned qualifies as a pure approach to a most peculiar form of collaboration known in mathematical game theory circles as the Nash Equilibrium (named after John Forbes Nash, who proposed it), which in fact is a solution concept of game theory wherein it involves two or more players, in which no player has anything to gain by changing only his or her own strategy unilaterally. If each player has chosen a strategy and no player can benefit by changing his or her strategy while the other players keep theirs unchanged, then the current set of strategy choices and the corresponding payoffs constitute a Nash Equilibrium. Stated simply, you and I are in Nash Equilibrium if I am making the best decision I can, taking into account your decision, and you are making the best decision you can, taking into account my decision. Likewise, many players are in Nash Equilibrium if each one is making the best decision (s)he can, taking into account the decisions of the others. The following information will background the current positions of the governments that would welcome this unique approach that economic alchemist would soon embrace in addressing an emerging economic globalization movement. The governments of the world, more specifically the industrialized nations, all suggest that sharing the wealth is the key to peace. Men of peace assume that the basis of most war is due to poverty and oppression, lack of opportunity, and rampant greed. However along with the wealth comes the responsibility and proper administration of it, thus the need for trade agreements unilaterally. With this movement for world peace through economic globalization, it is important to note and understand the framework whereby this goal is being achieved. As the United States is a major player and is participating in the commandeering of this transition, one of its unique economic approaches is brought to bear on the matter of international trade agreements and economic globalization in particular to E-commerce. It is at this point within the background explanation of this invention that we begin to experience the Nash Equilibrium. As entities worldwide begin to enhance their infrastructures to accommodate a variety of dynamics occurring within the sector of E-Commerce, legal framework such as the Electronic Signature in Global and National Commerce Act (E-sign) and the Uniform and Electronic Transaction Act (U.E.T.A.), Government Paper Elimination Act (GPEA), PDD-63 President Management Act, 1996, 2001, 2005, UNICITRAL Model Law for E-Commerce, E-Signature, and E-Contracting, all allowing for innovative electronic approaches approved for legal adoption by Local, State, National, and International Legislatures design to enhance E-commerce integrity. In the State of Utah, legislators have authored Rule 154-10-502 providing for Notary Public Acknowledgement by Electronic Communication mandating that, "Any person(s) executing a notarization using their digital signature and electronic communication requires live audio and visual communication.

The authors of these acts, based on the tenor of their words, appear to have anticipated increased E-economic activity via the world wide web as global trade agreements such as (GATT) Global Alliance Trade Tariffs, (NAFTA) North American Free Trade Agreement, (CAFTA) Central American Free Trade Agreement, (MEFTA) Middle East Free Trade Agreement, (FTAA) Free Trade Agreements of the Americas, (SACU) South African Customs Union, etc. . . . begin to have their effect in the E-commerce environment. In fact, it is part of the function of the United Nations and World Trade Organization to insure that civil stability will have its foundation as E-commerce interfaces "Nash" equilibrium principles. This form of game theory (Nash Equilibrium) is the observed hope that men of peace appear to be seeking in solving the aforementioned causes of war. However this game theory can be applied in other areas such as new and innovative approaches to Remote Electronic Notarization.

The intent of the aforementioned was not to highlight a mere mathematicians' logic, however, the basis of this art rest in its illustration of logic proper. The main point of this example, underscores the idea of software that can be linear in nature primarily developed to perform the task of incorporating several electronic system operations predicated on a procedure that at its nexus implements a proprietary steganography software unique to a particular electronic transaction, namely Remote Electronic Notarization, however not limited to the same; for example the system accommodates Drivers License Renewal, Passport Applications, Social Security Card Application, Green Card Application, Identity Management and Virtual I.D. cards, Credit Card Application, Voter registration and online voting authentication and validation and other public and private services. The system will provide for an online survey called a Client Assessment of Notary Survey (CANS) via both, Satellite network kiosk or online virtual kiosk application displaying in real-time via LED color coded indicator, categories of service efficiency i.e. professionalism, communication between notary/system and signatory/client, timeliness, etc. In addition for notarizations, it is contemplated to provide via system network, notary availability via LED color coded indicator, from 0 to 100 showing system activity for signatory to determine timeliness of remote electronic notary system response.

U.S. Pat. No. 5,712,914 Aucsmith et al. sites the use of digital certificates with multimedia extensions where the art provides for a medium to electronically encrypted form for transporting and manipulating data, images, and video, this art does not specifically identify the use of this manner for remote electronic notarization via kiosk or telecommunication device i.e. cellular or PDA.

U.S. Pat. No. 6,317,777 Skarbo et al. sites the collaboration of parties via video teleconferencing via computer mediums. However this art like Aucsmith neglects the manipulation of electronic documents and video capacity of cellular devices and the like.

U.S. Pat. No. 6,496,851 Morris et al. discloses the management of communications between users in a computer network. However this particular art is limited again by its failure to recognize other mediums that incorporate computer communications i.e. cellular devices or the like. In addition this art as is required by proposed art neglects video implementation via computers or telecommunications devices i.e. cellular, PDA.

U.S. Publication No. 2001/0002485 and U.S. Pat. No. 7,162,635 Bisbee et al. discloses an invention relating to systems and methods for providing a verifiable chain of evidence and security for the transfer and retrieval of documents and other information objects in digital formats. However Bisbee sites, "The traditional legally accepted methods of verifying the identity of a document's originator, such as physical presence or appearance, a blue-ink signature, personal witness or Notary Public acknowledgment, are not possible." This was short sighted and distances the arts' approach from the proposed art of remote electronic notarization.

U.S. Publication No. 2002/0156850 Hamscher et al. though abandoned, cited the negotiation of commercial transaction, e.g., the purchase and sale of an item of capital equipment using a communication network, e.g., the Internet. Using a standard web browser, e.g., Internet Explorer, buyers and sellers can connect to a website (operated by a website server) via the Internet. The website server has application software programmed to implement the negotiating functions that will be described below. If services that are ancillary to the purchase and sale become necessary in order to implement the transaction, these services (e.g., shipping, engineering, financing or legal services) can be accessed either through links provided on the website, or directly through the website. The buyer and seller can also contact consultants of their own (for example, their legal counsel) directly, either online or using conventional means such as mail or fax. Again though abandoned, this particular art, for the purposes of remote notarization does not allow for the screening and verification of signatories nor does it provide for a medium of communications via cellular devices. In addition for the uniqueness of the proposed art, the necessity to verify and authenticate is paramount to its function. This particular art fails to provide for this most crucial function as it pertains to remote electronic notarization. New inventions for paying on-line transactions are evolved and have eased the process.

U.S. Pat. No. 5,195,133 Kapp et al. cites an invention relating to a system and a method for processing signature-based payment transactions and more particularly relates to such a system and method in which a merchant's records of payment may be generated and maintained electronically without generation or use of paper records except those delivered to customers at the point of sale. This art relevance is to the administration of electronic merchant records and the generation of them, however, the art is short sighted as it pertains to the interfacing of this process within the scope of remote cellular/PDA and network functions interfacing with third party payment options as identified within the framework of the proposed art.

U.S. Pat. No. 4,731,840 Mniszewski et al. provides a method for the encryption, transmission, and subsequent decryption of digital keying data. The method utilizes the Data Encryption Standard and is implemented by means of a pair of apparatus, each of which is selectable to operate as either a master unit or remote unit. Each unit contains a set of key encryption keys which are indexed by a common indexing system. The master unit operates upon command from the remote unit to generate a data encryption key and encrypt the data encryption key using a pre-selected key encryption key. The encrypted data encryption key and an index designator are then downloaded to the remote unit, where the data encryption key is decrypted for subsequent use in the encryption and transmission data. Downloading of the encrypted data encryption key enables frequent change of keys without requiring manual entry or storage of keys at the remote unit.

BRIEF SUMMARY OF THE INVENTION

|  | Strategy | Benefit |
| --- | --- | --- |
| Notary | Provide Remote E-Notary services, increase availability, enhance roll as an officer of Sec. of State, increase income | Participate in the Satellite Network Kiosk and have access to new Client(s) via online website application |
|  | Use new technology in all areas of notary | Implement new technological protocols for remote electronic notarization, reduce travel expense. |

-continued

| | Strategy | Benefit |
|---|---|---|
| Signatory | Multi-lingual and E-Apostles | Offer multiple languages to help foreign Client(s) in their notary needs |
| | Assistance with identification verification to help Sec. of State and ensure the integrity of E-Commerce | Participate in online remote notarizations via World Wide Web |
| | Participate in new evolutions of E-Documents via newly automated Gov Auth. Systems | Usage of new E-Doc automation i.e. county recorders, interstate and international |
| | Receiving remote electronic notary service, enhance independence and convenience; save time and money | Ability to notarize via kiosk or on-line virtual kiosk application; increase internet trust, new notary experience, access to other services i.e. identity theft solutions, drivers license renewal etc . . . |
| | Identify theft protection tool in cyberspace | Develop habit of notarizing important legal documentation via remote electronic notarization |
| | Using Remote Notary Network for E-signature authentication | Embedded/encrypted E-signatures authentication; forgery prevention |
| | Using less paper to help protect environment | Tree preservation result in more oxygen, more trees filter noise pollution, paper reduction |
| Government Departments | ID verification and automation for E-documents | Quicker response to public needs in legal activity |
| | Biometric tracking | Track criminals, pedophiles, and terrorists |
| | Enhance trade foreign relation via E-Commerce of goods/shipping | Remote E-Apostles Domestic and foreign trade policy effective |
| | Increase employment via increased goods ordered | Increased Trust from consumers for on-line shopping |
| | E.P.A. has another economic tool to achieve its goal: protect the environment | Paper reduction |
| E-Commerce | Increase integrity for cyberspace | Identity protection via Remote E-Notary |
| | E-signature authentication enhancement | Embedded/encrypted signatures via cryptographic protocols |
| | Increase goods orders national/international/shipping | Jobs increased to fill manufacturers' orders |
| | Convenience of business | Remote Electronic Notaries available for legal E-commerce activity. |

As the charts indicate, Nash Equilibrium can be achieved as all of the aforementioned "implementing advocates" realize their benefit in the Remote Electronic Notarization matrix. However, the hope of these examples will provide the stage for the following detailed description of the Remote Electronic Notarization system and logic. The intent of the aforementioned was not to highlight a mere mathematicians' logic, however, the basis of this art rest in its illustration of logic proper. The main point of this example, underscore the idea of software that is linear in its nature primarily developed to perform the task of incorporating several electronic system operations predicated on a procedure that at its nexus implements a steganographic cryptographic protocol unique to a particular electronic transaction, namely Remote Electronic Notarization, however not limited to the same for example the system accommodates Drivers License Renewal, Passport Applications, Social Security Card Application, Green Card Application, Real I.D., Credit Card Application etc. It is also contemplated that the system will provide for an on-line survey via both, Satellite network kiosk or on-line virtual kiosk application displaying in real-time via LED color coded indicator, categories of service efficiency i.e. professionalism, communication between notary/system and signatory/client, timeliness, etc. In addition for notarizations, it is contemplated to provide via system network, notary availability via LED color coded indicator, from 0 to 100 showing system activity for signatory to determine timeliness of remote electronic notary system response.

Various objects, features, aspects, and advantages of the present invention will become more apparent from the following detailed description of preferred embodiments of the invention, along with the accompanying drawings in which like numerals represent like components.

DETAILED DESCRIPTION

Client(s) Registration

Figure 1:
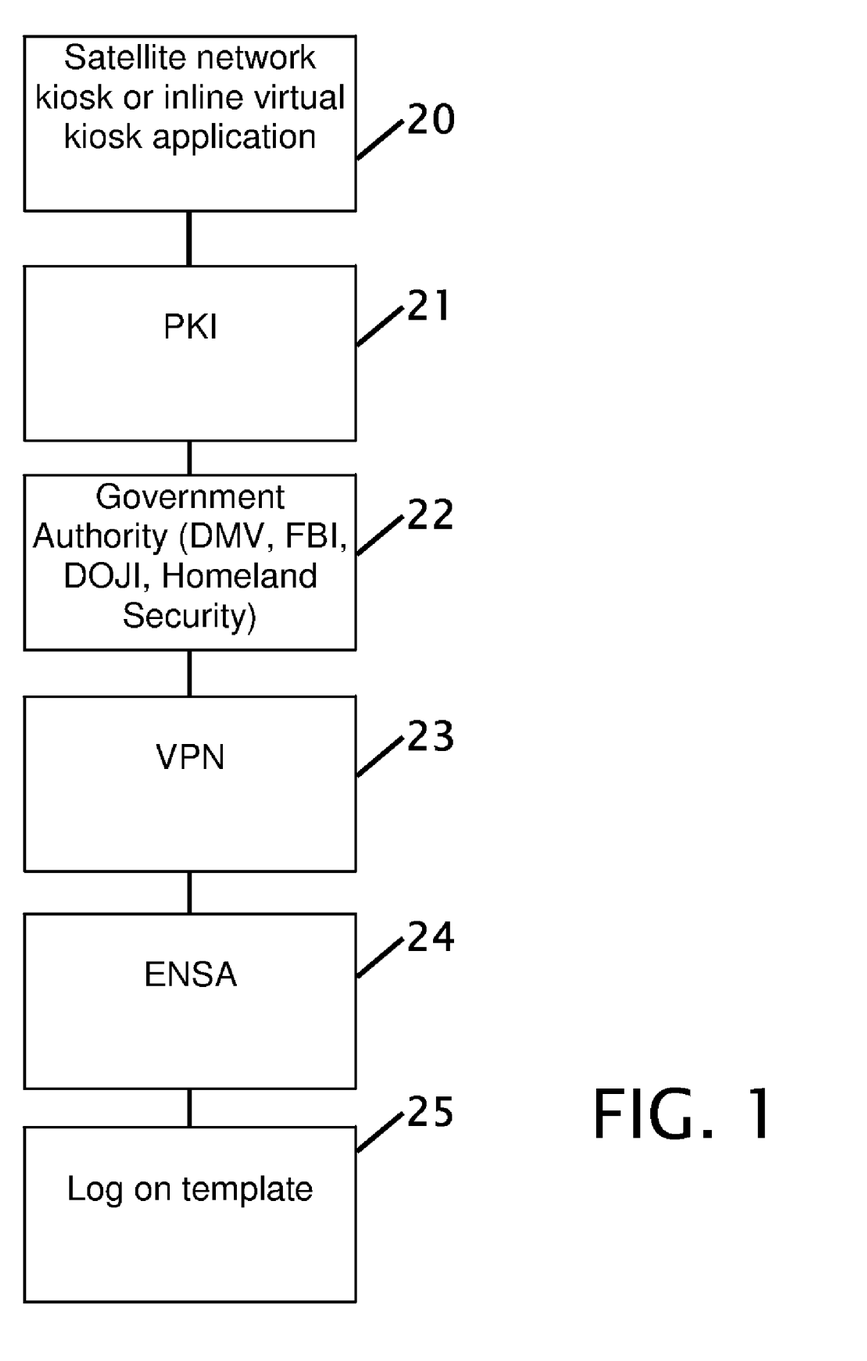
FIG. 1 shows the Client Registration flow chart.
Figure 15:
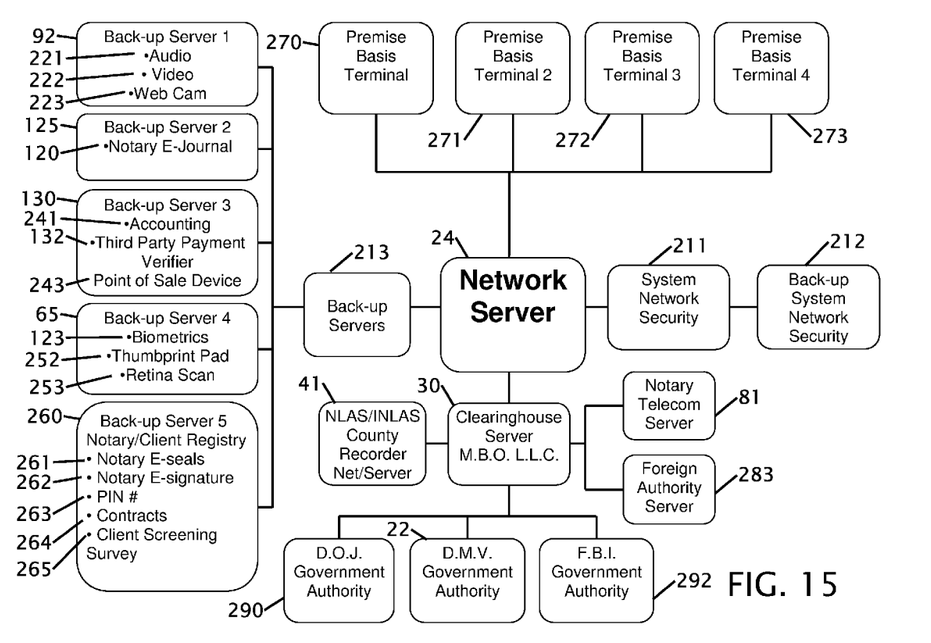
FIG. 15 shows a flow diagram of a network server and the connections to the server.

FIG. 1 shows the Client Registration flow chart. Satellite network kiosk or on-line virtual kiosk application 20 via interface/interlink Public Key Infrastructure (PKI) 21 Dept of Justice/Government Authority (DOJ/GA Server), Federal Bureau Of Investigation/Government Authority (FBI/GA Server), Dept Of Motor Vehicles/Government Authority (DMV/GA) 22 via interface/interlinked Virtual Private Network (VPN) 23 interface/interlinked Electronic Network Server Authority (ENSA) 24 via touch screen technology/keyboard deploying log on template 25. FIG. 15 shows that the Electronic Network Server Authority (ENSA) 24 is connected to a number of Premise Basis Terminals 270, 271, 272 and 273 a number of back-up servers 213 and has system network security 211 with a back-up system for network security 212.

Figure 2:
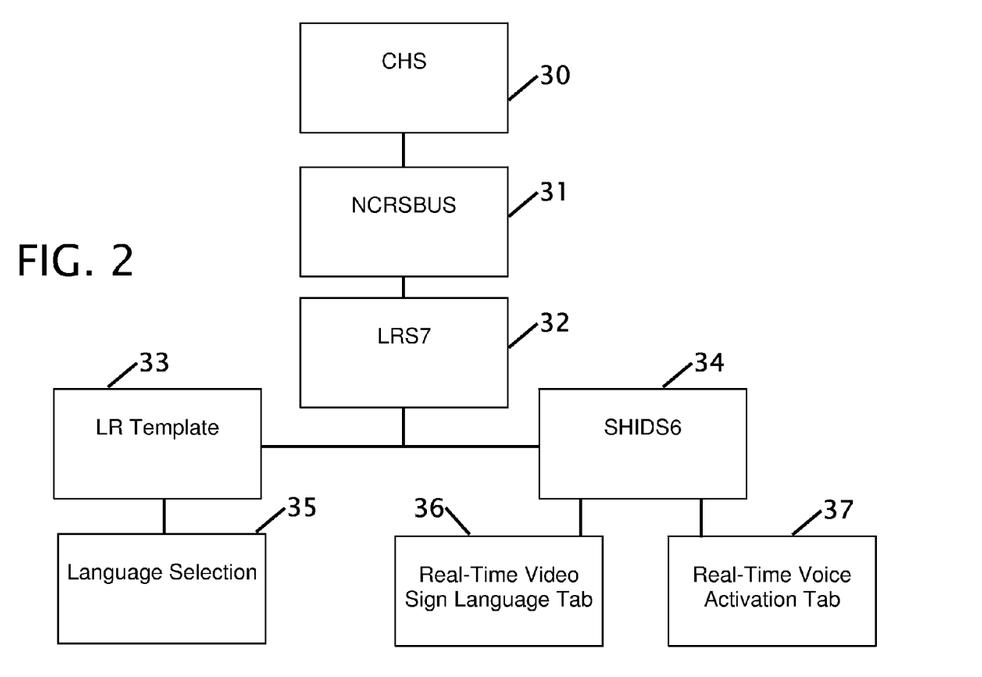
FIG. 2 shows the continued process of the Client Registration from the satellite network.

FIG. 2 shows the continued process of the Client Registration from the satellite network. The Satellite network kiosk or on-line virtual kiosk application via interface/interlink Public Key Infrastructure (PKI) interface/interlinked Virtual Private Network (VPN) interface/interlinked Electronic Network Server Authority (ENSA) interface/interlink Clearing House Server (CHS) 30, Notary/Client(s) Registry Server (NCRSBU5) 31, Language Repository Server (LRS7) 32 accessing and prompting Language Repository (LR) selection template 33. Language Repository Server (LRS7) 32 interface Sight/Hearing Impaired Disability Server (SHIDS6) 34 prompting Audio Tab template for Sight Impaired, Video Sign Hand Language Tab 36 template for Hearing Impaired, or Voice Actuation Tab 37. The Signatory selects the required languages, interfacing system network operation to configure transaction to selected format. Language Repository 35 (LRS7) system that will integrate with the tenets of the American Disabilities Act (ADA) for language compliance.

Figure 3:
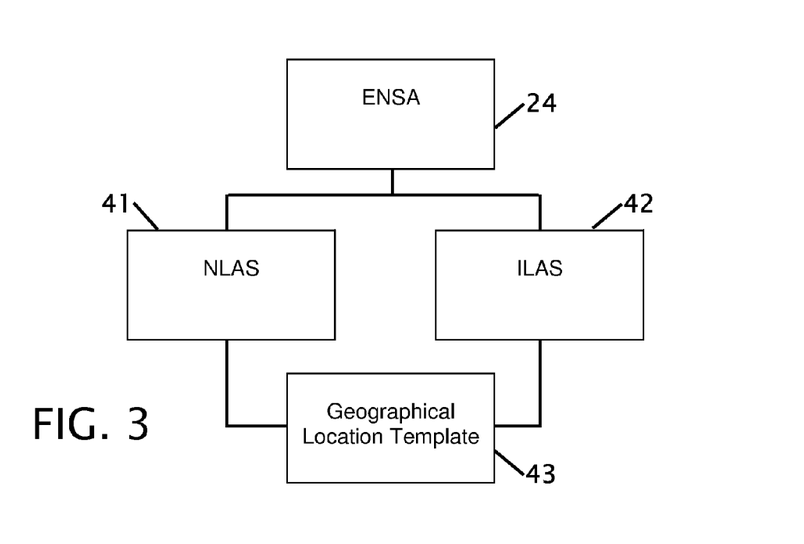
FIG. 3 shows the ENSA module for Client Registration.

FIG. 3 shows the ENSA 24 module for Client Registration. The satellite network kiosk or on-line virtual kiosk application via Public Key Infrastructure (PKI) via interface/interlinked Virtual Private Network (VPN) Electronic Network Server Authority (ENSA), Clearing House Server (CHS), interface/interlink prompting geographical location template 43 interfacing\interlink via Public Key Infrastructure (PKI) interface/interlinked Virtual Private Network (VPN) connectivity of National Local Authority Server (NLAS) 41 or International Local Authority Server (ILAS) 42. The system can further include connection to a foreign authority server 283.

Figure 4:
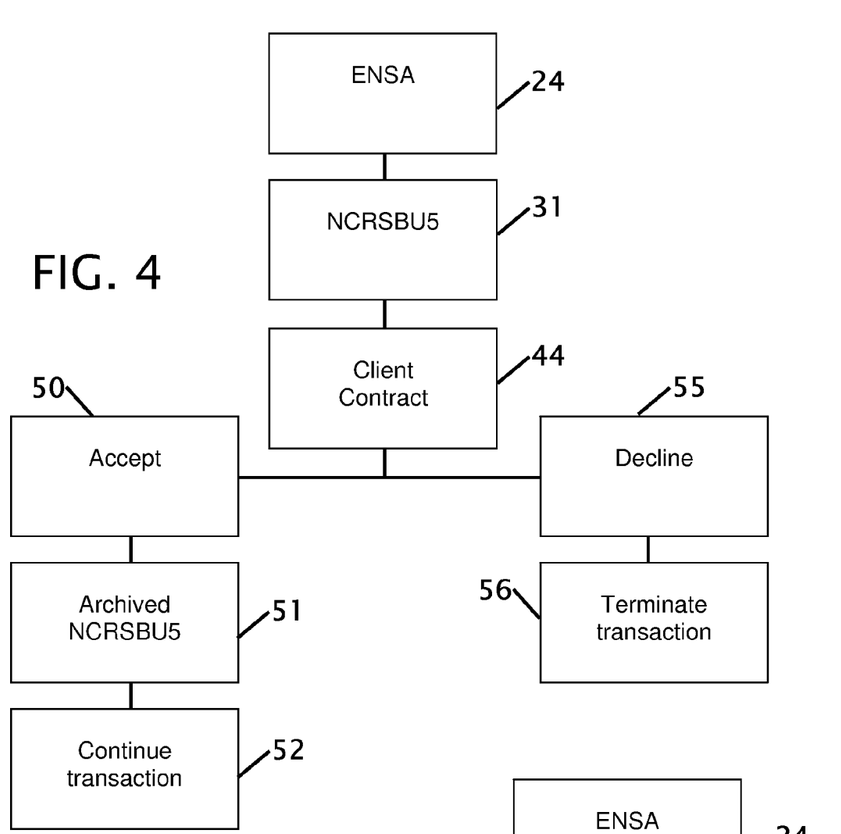
FIG. 4 shows the process of a client logging into the system

FIG. 4 shows the process of a client logging into the system. The satellite network kiosk or on-line virtual kiosk application via Public Key Infrastructure (PKI) interface/interlinked Virtual Private Network (VPN) interface/interlink Electronic Network Server Authority (ENSA) 24 interface/interlink, Clearing House Server (CHS), Notary/Client(s) Registry Server (NCRSBU5) 31 prompting Client(s) Contract (CC) template. Client(s) Contract (CC) 44 template prompts to accept 50 or decline 55. If Client(s) Contract (CC) is declined, the transaction will terminate 56. If Client(s) Contract (CC) is accepted electronic transaction record will continue. The acceptance 50 is Archived in the NCESBU5 51. The transaction is then continued 52.

Figure 5:
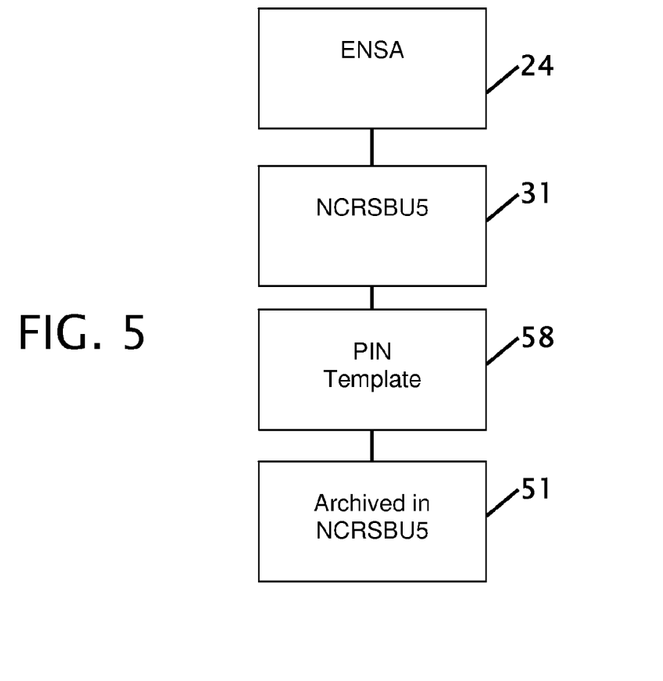
FIG. 5 shows the continued process of a client logging into the system.

FIG. 5 shows the continued process of a client logging into the system. Satellite network kiosk or on-line virtual kiosk application via Public Key Infrastructure (PKI) interface/interlinked Virtual Private Network (VPN) interface/interlink Electronic Network Server Authority (ENSA) 24 interface/interlinks the Clearing House Server (CHS), Notary/Client(s) Registry Server (NCRSBU5) 31 prompting Personal Identification Number (PIN) template 58 for (PIN) composition. Completion of (PIN) composition is now electronically affixed to electronic transaction record as the Signatory's Personal Identification Number (PIN) for future system verification of Signatory and future access to network. Both, Client(s) Contract (CC) and Personal Identification Number (PIN), will be archived via Electronic Network Server Authority (ENSA) and Clearing House Server (CHS) into the Notary/Client(s) Registry Server (NCRSBU5) 51.

Figure 6:
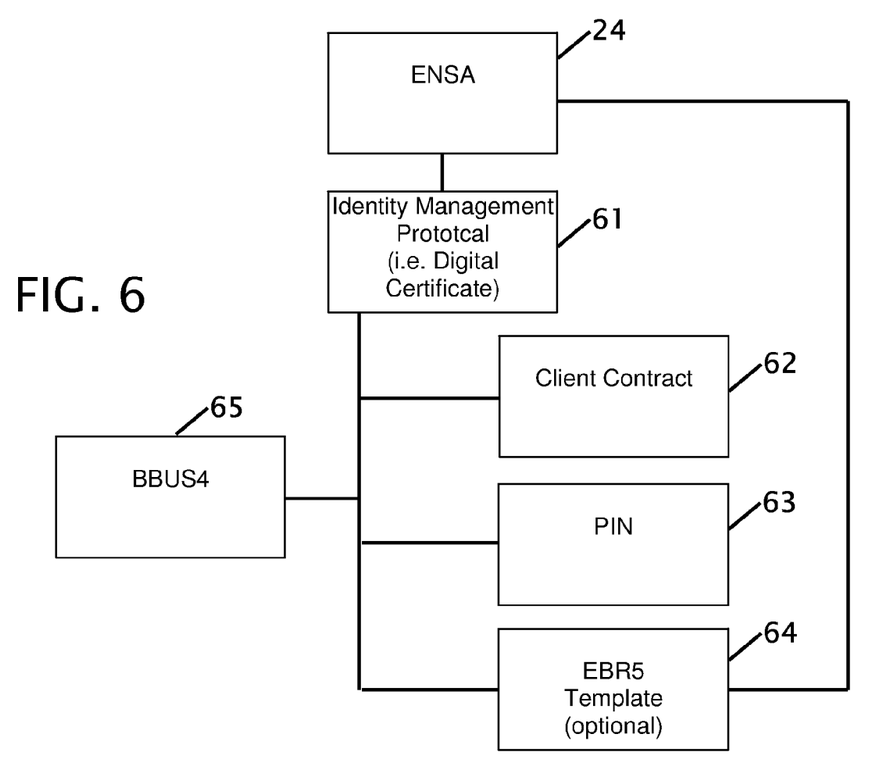
FIG. 6 shows the client registration into the system. FIG.
Figure 7:
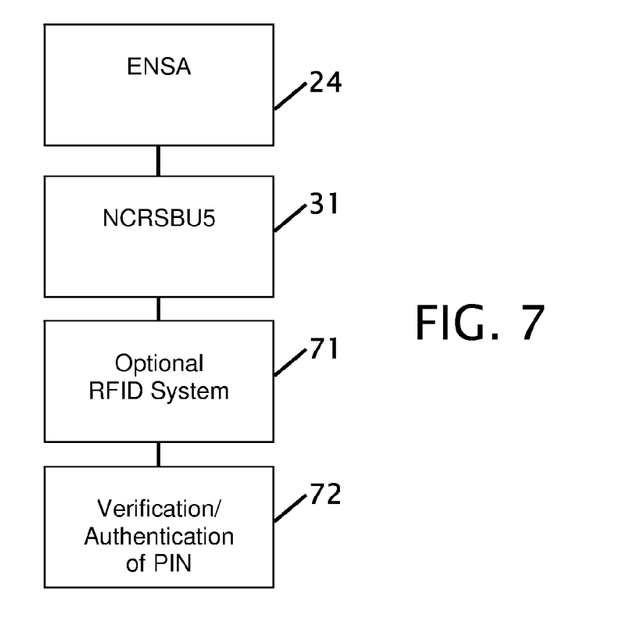
FIG. 7 shows the client registration into the system.

FIGS. 6 and 7 shows the client registration into the system. Public Key Infrastructure (PKI) via interface/interlinked Virtual Private Network (VPN) interface/interlinked Electronic Network Server Authority (ENSA) 24, Clearing House Server (CHS) will issue a digital certificate 61 to the Signatory's electronic transaction record. Satellite network kiosk via Public Key Infrastructure (PKI) via interface/interlinked Virtual Private Network (VPN) interface/interlinked Electronic Network Server Authority (ENSA), interface Electronic Biometric Retina 253 Scan (EBRS) template for optional Signatory authentication and verification of Signatory identification information logically linked to Signatory's Client(s) Contract (CC) 62 and Personal Identification Number (PIN) 63.

Satellite network kiosk via Public Key Infrastructure (PKI) via interface/interlinked Virtual Private Network (VPN) interface/interlinked Electronic Network Server Authority (ENSA) 24, Clearing House Server (CHS) 30 interfaces Electronic Biometric Retina Scan (EBRS) 64 template displaying options for Retina Scan, Electronic Biometric Retina Scan (EBRS) device will deploy Electronic Biometric Retina Scan (EBRS) capturing template instruction.

Satellite network kiosk via Public Key Infrastructure (PKI) via interface/interlinked Virtual Private Network (VPN) interface/interlinked Electronic Network Server Authority (ENSA) 24, Clearing House Server (CHS) 30 interfaces Electronic Biometric Retina Scan device infra-red scanner affixed to Satellite network kiosk, captures the electronic retinal record of the Signatory. Signatory electronic retinal record will via Electronic Network Server Authority (ENSA), Clearing House Server (CHS) 30, logically link to Signatory's Client(s) Contract (CC) and Personal Identification Number (PIN) and archive to the Biometric Back-Up Server (BBUS4) 65. This completes the Signatory registration and required network system activations for both satellite network kiosk and on-line virtual kiosk application.

In FIG. 7 the satellite network kiosk via Public Key Infrastructure (PKI) interface/interlinked Virtual Private Network (VPN) interface/interlink Electronic Network Server Authority (ENSA) 24 interface/interlinks the Clearing House Server (CHS), Notary/Client(s) Registry Server (NCRSBU5) 31 interfaced/interlinked to a Radio Frequency Identification Digital system and (RFID) 71 Reader. The reader is a fixed-mount device in the Satellite Kiosk or End-User device, emitting electromagnetic (radio) waves or the like. These waves or the like can range from one inch to 100 feet and is dependent on power output and the radio frequency used. The reader generates an electromagnetic field through its antenna. Once the RFID 71 tag enters the detection area, it becomes active when receiving a signal through its own antenna. This signal is used to turn on the RFID 71 tag's transmitter and allows the RFID 71 tag to communicate and exchange information with the reader. The reader then transmits the data to Electronic Network Server Authority (ENSA) interface/interlinks the Clearing House Server (CHS), Notary/Client(s) Registry Server (NCRSBU5) Radio Frequency Identification Digital system for processing and management. A small amount of radio frequency energy passes from the reader energizing the dormant RFID tag which then emits a radio frequency signal transmitting the individual's unique verification number. This individual's unique verification number is verified and authenticated by the Notary/Client(s) Registry Server (NCRSBU5) 31 corroborating information of the newly created PIN 72. Future access to the Electronic Network Server Authority (ENSA) Satellite Kiosk or End-User device can now occur via RFID 71 detection and PIN 72 entry.

Remote Electronic Notary Connectivity

Figure 8:
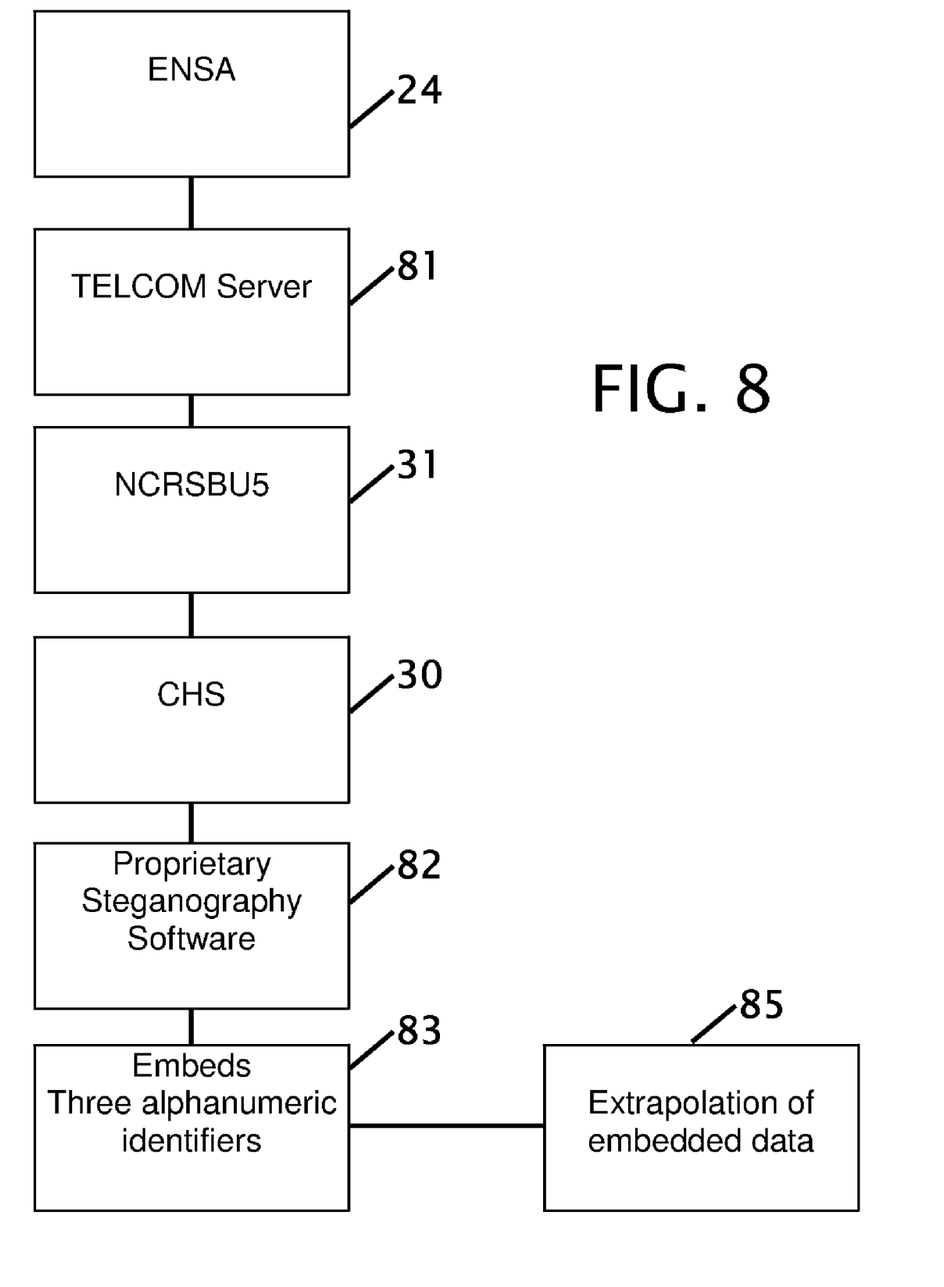
FIG. 8 show the remote electronic connectivity
Figure 9:
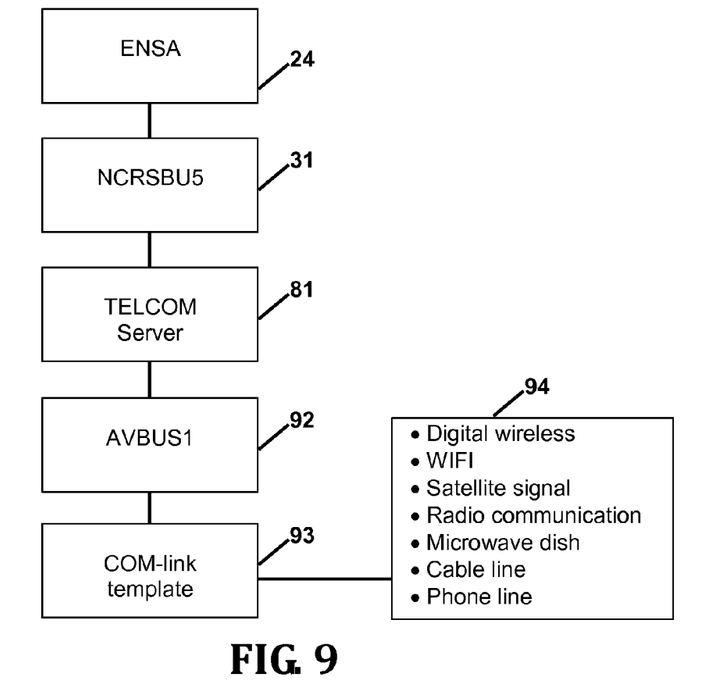
FIG. 9 show the remote electronic connectivity

FIGS. 8 and 9 show the remote electronic connectivity. The satellite network kiosk or on-line virtual kiosk application interface/interlink with Public Key Infrastructure (PKI) via Virtual Private Network (VPN) interface/interlinked Electronic Network Server Authority (ENSA) 24, Clearing House Server (CHS) 30, Notary/Client(s) Registry Server (NCRSBU5) 31, TELCOM Server 81, Audio 221/Video 222 Back-Up Server 1 (AVBUS1) 92, from FIG. 15, interface/interlink H.323 protocol compliant electronic audio/video software, prompts COM-link template for connectivity to Cellular/PDA Device or Portable PC Device. Other connection means are contemplated including but not limited to digital wireless, WIFI, satellite signal, radio communication, microwave dish, cable line, or phone line. Established COM-link will deploy Notary pre-registered cellular/PDA device or portable pc device, Web-Cam 223 with microphone on Satellite network kiosk. Established COM-link will interface on-line virtual kiosk application for end user system Web-Cam 223 with microphone deployment. Audio/video system provides "Picture in Picture" or "Split Screen" on both Cellular/PDA or Portable PC Device and satellite network kiosk or on-line virtual kiosk application interfacing both parties; Notary and Signatory, to real-time recorded video imagery and sound as well as provide the Notary a visual medium for the Signatory electronic document.

Satellite network kiosk or on-line virtual kiosk application interface/interlink with Public Key Infrastructure (PKI) via Virtual Private Network (VPN) interface/interlinked Electronic Network Server Authority 24 (ENSA), Clearing House Server (CHS) 30, from FIG. 15, TELCOM Server, Notary/Client(s) Registry Server 31 (NCRSBU5) interface/interlink to deploy a proprietary steganography software 82 of three alphanumeric identifiers which are: the notary pre-registered cellular/PDA device or portable pc device identification number, notary commission number, and electronic notary seal 261 data (from FIG. 15) in back-up server 5 260 providing the, "Electronic DNA" for the particular Remote Electronic Notarization transaction. Back-up server 5 260 also includes the notary E-signature 262, contacts 264 and client screening survey information 265. In the preferred embodiment three alphanumeric identifiers are used it is contemplated that any number from one to more than three can be used. These three alphanumeric identifiers 83 will be electronically embedded via proprietary steganography software 82. The functionality of the addresses the following;

Who?: Notary Public and Signatory

What?: Electronic embedding within the electronic fonts of a digital signature

When?: Via establishment of COM-link between Notary and Signatory

Where?: All digitally signed documents executed by both the Notary Public and Signatory.

Why?: Increase security, Decrease fraud, verify validation and authenticate all digital signatures of both the Notary Public and Signatory How?: Notary Public, upon registration with the remote electronic notary network, will receive a Digital Certificate for their notary pre-registered cellular/PDA device or portable pc device identification number, notary commission number, and electronic notary seal. Digital Certificate will interface interlink with Clearinghouse server for embedding via proprietary steganography software.

After acceptance of AYIN contract for a remote electronic notarization transaction, Signatory will register for their Digital Certificate, which establishes a digital signature. After the Digital Certificate is acquired, Digital Certificate will interface/interlink with Clearinghouse server deploying the proprietary steganography software to embed both the signatory and the notary digital signatures.

ENSA 24 Server will house the proprietary steganography software consisting of both alpha and numeric codes. The proprietary steganography software will electronically embed the digital signatures within the electronic fonts for the Digital Certificate. For example the letter and numerals below have corresponding symbols representing the electronic fonts for embedding. Upon acquisition of a Digital Certificate for a Digital Signature, if the letter "A" is typed the proprietary steganography software will electronically embed the "A" with a (.) period. If the number 6 is typed then the proprietary steganography software will electronically embed an open parenthesis [(] within the electronic font of 6. (See example of electronic embedding legend below) and in FIG. 9A.

Figure 9A:
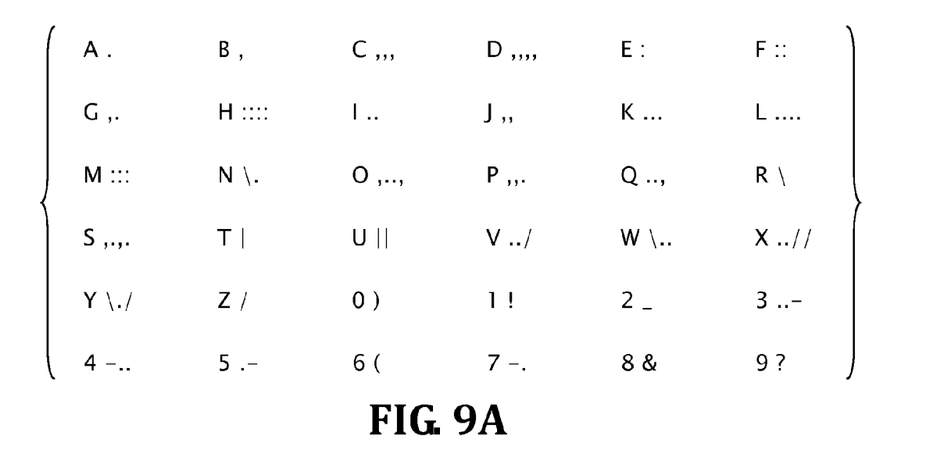
FIG. 9A show an example of a table of an electronic embedding legend.

| A . | B , | C ,,, | D ,,,, | E : | F :: |
|---|---|---|---|---|---|
| G ,. | H :::: | I .. | J ,, | K ... | L .... |
| M ::: | N \. | O ,..., | P ,,. | Q .., | R \ |
| S ,,,, | T \| | U \|\| | V ../ | W \.. | X ..// |
| Y \./ | Z / | 0 ) | 1 ! | 2 _ | 3 ..- |
| 4 -.. | 5 .- | 6 ( | 7 -. | 8 & | 9 ? |

Extrapolation of electronically embedded data 85 will occur upon request via network authority via proprietary steganography software for future authentication and third party examination verification of digital signatures. Proprietary steganography software feature functions only upon establishment of a COM-link between notary and signatory. Other forms of connectivity are considered such as holograms and other forms of dimensional imagery interfaced/interlinked, which may also be steganographically embedded and interfaced with a real-time audio/video remote communication via a secure network.

Signatory Assessment Screening Survey (SASS)

Figure 10:
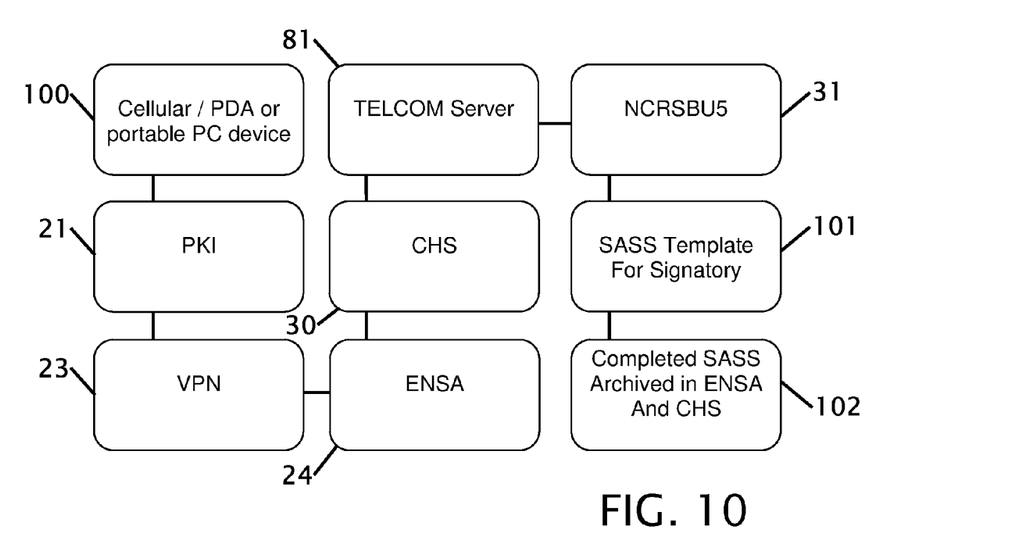
FIG. 10 shows the Signatory Assessment Screening Survey (SASS).
Figure 14:
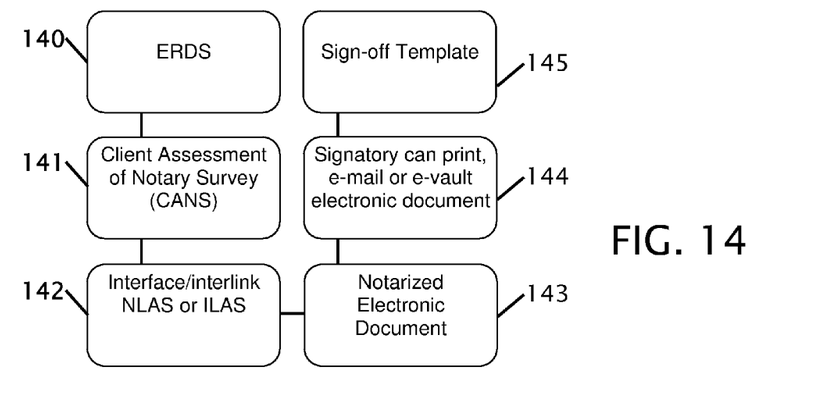
FIG. 14 shows the retrieval and final disposition of notarized electronic documents ERDS.

FIG. 10 shows the Signatory Assessment Screening Survey (SASS) 141 (FIG. 14). Cellular/PDA or Portable PC Device 100 interface/interlink with Public Key Infrastructure (PKI) 21 via Virtual Private Network (VPN) interface/interlink Electronic Network Server Authority (ENSA) 24, Clearing House Server (CHS) 30, TELCOM Server 81, and Notary/Client(s) Registry Server (NCRSBU5) 31 interface/interlink to deploy the Signatory Assessment Screening Survey (SASS) template 101 which prompts Signatory required data entry and electronic signature of Signatory via electronic signature capture device or key board into Signatory Assessment Screening Survey (SASS). Electronic Network Server Authority (ENSA) 24, Clearing House Server (CHS) 30, electronically records both audio/video real-time data streams and completed Signatory Assessment Screening Survey (SASS) 141 (FIG. 14) archived to Notary/Client(s) Registry Server (NCRSBU5).

Electronic Document Retrieval and Disposition

Figure 11:
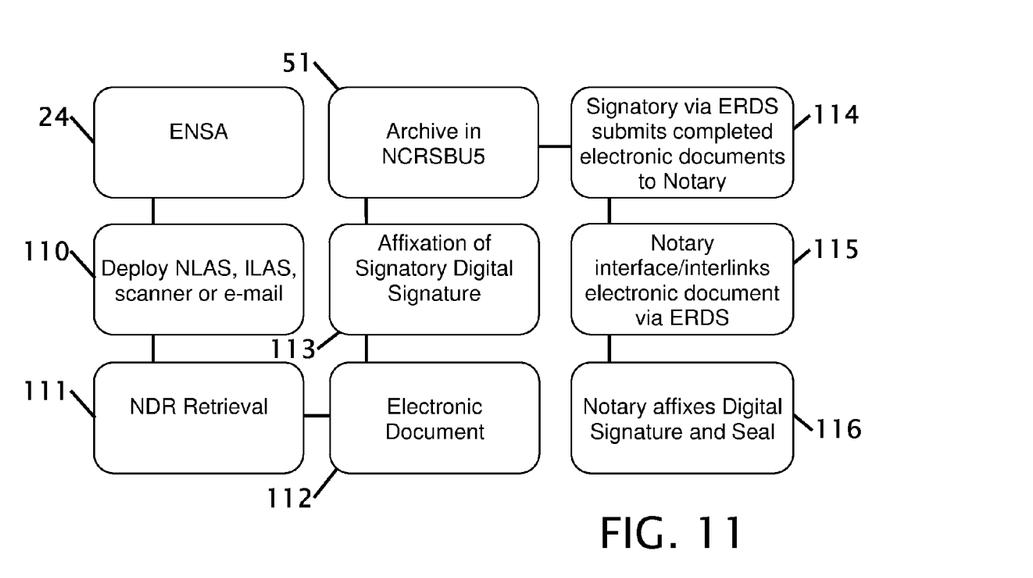
FIG. 11 shows the electronic document retrieval and disposition.

FIG. 11 shows the electronic document retrieval and disposition. The satellite network kiosk or on-line virtual kiosk application interface/interlink with Public Key Infrastructure (PKI) via Virtual Private Network (VPN) interface/interlink Electronic Network Server Authority (ENSA) 24, Clearing House Server (CHS) 30, TELCOM Server, Audio/Video Back-Up Server 92 (AVBUS1) COM-link via Cellular/PDA or Portable PC Device, prompts, via "Picture In Picture" or "Split Screen" on monitor screen of both the Cellular/PDA or Portable PC Device interface/interlink Network Document Repository (NDR) interfacing both National Local Authority Server (NLAS) or International Local Authority Server (ILAS) 110 for electronic document selection, deploying satellite network kiosk electronic scanning device or (create up-link via on-line virtual kiosk application from end user electronic scanning device), or interface/interlink electronic retrieval 111 of electronic document 112 via electronic records delivery systems. Electronic document template displays via "Picture in Picture" or "Split Screen" on monitor screen of both the Satellite network kiosk or on-line virtual kiosk application and Cellular/PDA or Portable PC Device. Electronic beacon alerts highlights vacant Electronic Document template fields prompting Signatory execution 113 of the same synchronizing and deploying steganographic and cryptographic encrypted protocol of the notary 114 pre-registered cellular/PDA device or portable pc device identification number, notary commission data, steganographically embedded 115 within the electronic font signature print lines of the Signatory's electronic signature 116 per implement. Signatory execution interfaces network archiving of required information. The document, and signature with the steganographically embedded within the electronic font print lines of the Signatory's electronic signature is archived in the NCRSBU5 51.

Satellite network kiosk or on-line virtual kiosk application interface/interlink with Public Key Infrastructure (PKI) via Virtual Private Network (VPN) interface/interlink Electronic Network Server Authority (ENSA) 24, Clearing House Server (CHS), TELCOM Server 81, Audio/Video Back-Up Server (AVBUS1) 92 COM-link via Cellular/PDA or Portable PC Device prompts transmitting template of electronic documents via electronic records delivery system COM-linked 93 to 94 digitally wire-less broadband cellular/PDA device or portable pc device deploying an interactive mode/end user block for electronic document with cellular/PDA device or portable pc device for electronic document data entry of Notary Electronic Seal and Notary Electronic Signature, via notary cellular/PDA device or portable pc device.

Electronic Journal

Figure 12:
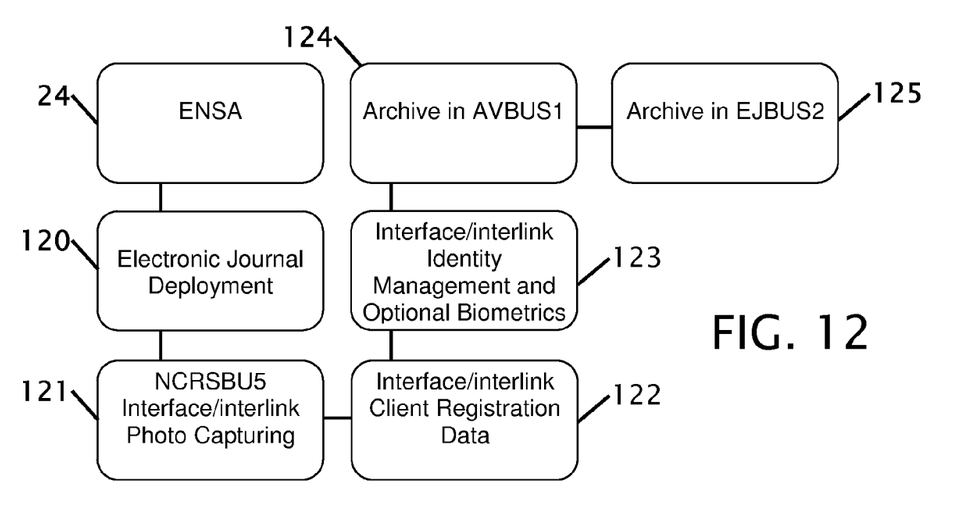
FIG. 12 shows the Electronic Journal.

FIG. 12 shows the Electronic Journal. The satellite network kiosk or on-line virtual kiosk application interface/interlink with Public Key Infrastructure (PKI) 21 via Virtual Private Network (VPN) 23 interface/interlink, Electronic Network Server Authority (ENSA) 24, Clearing House Server (CHS) 30, TELCOM Server 81, Audio 221/Video 222 Back-Up Server 92 (AVBUS1), Electronic Journal 120 Back-Up Server (EJBUS2) 125 (from FIG. 15) prompts, via "Picture In Picture" or "Split Screen" on monitor screen of both the Cellular/PDA or Portable PC Device 100 interface/interlink deploying Electronic 120 Journal template displaying vacant fields beacon alerts via monitor screen of both the Cellular/PDA or Portable PC Device and satellite network kiosk apparatus or on-line virtual kiosk application, Web Cam 223 with microphone connectivity, Electronic Signature capturing device, Electronic Thumb-print Pad 252 COM-linked to notary Cellular/PDA or Portable PC Device 100 via notary pre-registered Cellular/PDA or Portable PC identification. Electronic beacon alerts highlights vacant Electronic Journal template fields prompting Signatory execution data entry. Electronic Thumb-print Pad 252 Capturing Device template will display (for Satellite Kiosk Only) prompting Signatory 101 execution of implementation of Electronic Thumb-print Pad, systematically appended to Signatory Personal Identification Number (PIN) 263, interfacing and synchronizing real-time verification to Cellular/PDA or Portable PC Device via Dept of Justice/Government Authority (DOJ/GA Server) 290 and Federal Bureau Of Investigation/Government Authority 292 (FBI/GA Server) or the like however not limited to the same.

Satellite network kiosk or on-line virtual kiosk application interface/interlink with Public Key Infrastructure (PKI) via Virtual Private Network (VPN) interface/interlink, Electronic Network Server Authority (ENSA), Clearing House Server (CHS), TELCOM Server, Notary/Client(s) Registry Server (NCRSBU5) 31, Electronic Journal Back-Up Server 125 (EJBUS2), Audio 221/Video 222 Back-Up Server 1 (AVBUS1) 92 (AVBUS1) interface/interlink Electronic Web Cam 223 with microphone template for execution of still Electronic Photo 121 of Signatory systematically appended to Signatory Personal Identification Number (PIN) 263. When complete the completed SASS is archived in AVBUS1 124 ENSA and CHS 102. The data is interfaced/interlinked with the client registration data 122. Optionally the interface/interlink identity management is combined with biometrics 123. The information is further archived in EJBUS2 125.

Satellite network kiosk or on-line virtual kiosk application interface/interlink with Public Key Infrastructure (PKI) via Virtual Private Network (VPN) interface/interlink, Electronic Network Server Authority (ENSA) 24, Clearing House Server 30 (CHS), TELCOM Server 81, Notary/Client(s) Registry Server (NCRSBU5) 31, Electronic Journal Back-Up Server 125 (EJBUS2) deploying Signatory identification template beacon alerts highlights vacant fields, prompting data entry execution via Satellite Kiosk Point of Sale Device 243 or on-line virtual kiosk application end user data entry device interfacing real-time and prompts for other electronically verifiable Signatory identification will be requested. Signatory non-compliance interfaces Electronic Network Server Authority (ENSA) to terminate remote electronic notary transaction.

Client Payment/Third Party Payment Verifier Connectivity

Figure 13:
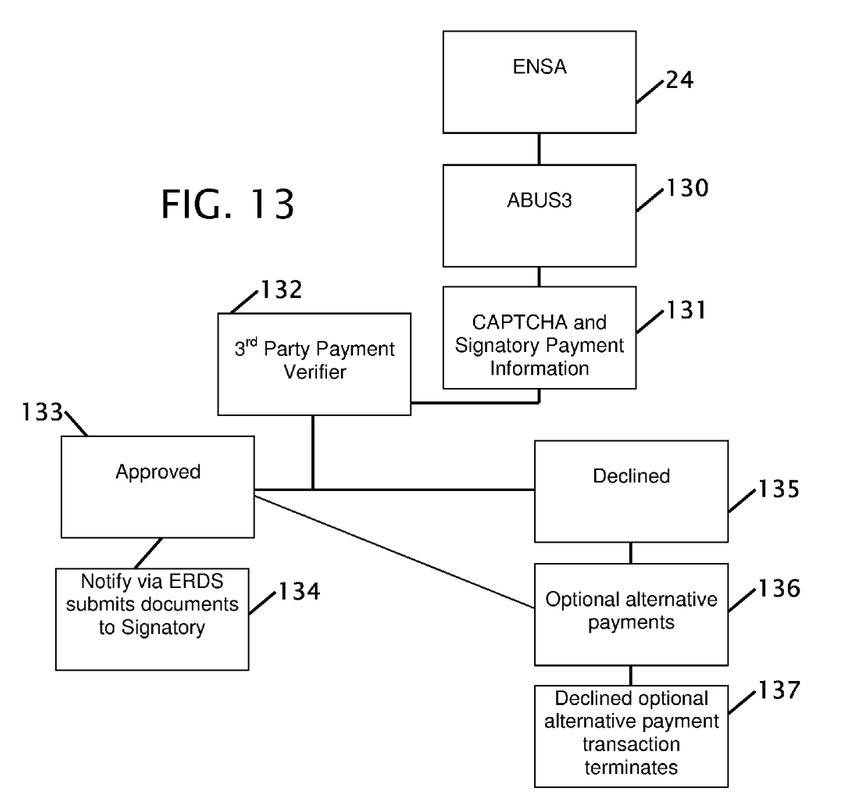
FIG. 13 shows a client payment/third party payment verifier connectivity.

FIG. 13 shows a client payment/third party payment verifier connectivity. Satellite network kiosk or on-line virtual kiosk application interface/interlink with Public Key Infrastructure (PKI) via Virtual Private Network (VPN) interface/interlink Electronic Network Server Authority (ENSA) 24, Clearing House Server (CHS) 30, Accounting 241 Back-Up Server 130 (ABUS3), prompts payment template requesting CAPTCHA 131 entry and data entry of Signatory payment information interface/interlink for Signatory payment processing via third party payment verifier 136 electronically signaling via Electronic Network Server Authority (ENSA) 24, Clearing House Server (CHS) 30, TELCOM Server 81, Satellite network kiosk or on-line virtual kiosk application interface/interlinked COM-linked to digitally wire-less broadband Cellular/PDA device or portable pc device, approval 133 or denial 135 of Signatory payment. If Signatory payment is denied, Accounting 241 Back-Up Server 130 (ABUS3) will prompt alternative payment options. If Signatory payment alternatives are denied via third party payment 132 verifier, Electronic Network Server Authority (ENSA) terminates 137 the Remote Electronic Notary Transaction.

The third party payment verifier 132 electronic approval 133 of the aforementioned, prompts Cellular/PDA device or portable pc device via interface/interlinked Electronic Network Server Authority (ENSA) 24, Clearing House Server (CHS), TELCOM Server 81, Accounting 241 Back-Up Server 130 (ABUS3), archive Signatory payment to Accounting 241 Back-Up Server 130 (ABUS3). Upon approval 133 the system will notify via ERDS 140 that submits the documents to the signatory 134. Cellular/PDA device or portable pc device interface/interlinked TELCOM Server 81, Clearing House Server (CHS) 30, Electronic Network Server Authority (ENSA) 24 interface/interlink Virtual Private Network (VPN) via Public Key Infrastructure (PKI) interface/interlink to on-line virtual kiosk application or Satellite network kiosk via electronic records delivery system transmits notarized electronic document displaying notarized electronic document via monitor screen.

Additionally, Satellite network kiosk or on-line virtual kiosk application interface/interlink with Public Key Infrastructure (PKI) via Virtual Private Network (VPN) 23 interface/interlink via Electronic Network Server Authority (ENSA) 24, Clearing House Server (CHS) 30 notarized electronic document designated (i.e. deeds, title documents etc.) for National Local Authority Server (NLAS) or International Local Authority Server (ILAS) will receive notarized electronic document via electronic records delivery system transmission per Uniform Real Property Electronic Recording Act (URPERA) electronic protocols.

Client Retrieval and Final Disposition of Notarized Electronic Document

FIG. 14 shows the retrieval and final disposition of notarized electronic documents ERDS 140. Cellular/PDA device or portable pc device interface/interlinked TELCOM Server 81, Clearing House Server (CHS) 30, Electronic Network Server Authority (ENSA) 24 interface/interlink Virtual Private Network (VPN) 23 via Public Key Infrastructure (PKI) 21 interface/interlink to on-line virtual kiosk application or Satellite network kiosk via electronic records delivery system transmits notarized electronic document 143 displaying notarized electronic document 143 via monitor screen, prompting final electronic document disposition template displaying, via monitor screen, three tab options. A client assessment of notary survey (CANS) 141 is available for feedback from the signatory.

Final electronic document disposition template display will alert system to interface/interlink tab (1) to third party archive server via secured Public Key Infrastructure (PKI) 21 interface/interlinked Virtual Private Network (VPN) 23 interface/interlink network connectivity of National Local Authority Server (NLAS) or International Local Authority Server (ILAS) 142 optioning, via monitor screen, transmission/archiving instructions for electronic document disposition prompting third party archive system interface optioning transmission/archiving instructions for electronic document disposition.

Final electronic document disposition template display will alert system to interface/interlink tab (2) Satellite network kiosk or on-line virtual kiosk application interface/interlink with Public Key Infrastructure (PKI) via Virtual Private Network (VPN) interface/interlink via Electronic Network Server Authority (ENSA) 24, Clearing House Server (CHS) 30 interface/interlinked internet electronic records delivery system transmission for post retrieval.

Final electronic document disposition template display will alert system to interface/interlink tab (3) Satellite network kiosk or on-line virtual kiosk application interface/interlink with Public Key Infrastructure (PKI) via Virtual Private Network (VPN) interface/interlink via Electronic Network Server Authority (ENSA) 24, Clearing House Server (CHS) 30 interface/interlink deployment of electronic printer device of Satellite network kiosk (for on-line virtual kiosk application, printer tab option for end user printing device deployment). Electronic Network Server Authority (ENSA) 24, Clearing House Server (CHS), compiles all electronic records germane to particular transaction archiving all pertinent backup servers. Electronic Network Server Authority (ENSA) 24 terminates Remote Electronic Notary Network System via sign-off template 145 optioning printing of the transaction information/receipt or via electronic records delivery system, transmits information/receipt germane to the transaction to a remote computer. The signatory can print, email or e-vault the electronic document 144.

Thus, specific embodiments of a System for Remote Electronic Notarization and Signatory Verification and Authentication/Interface/interlinked with proprietary steganography software has been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A system for real-time remote electronic notarization comprising:
    a user having a data input device having an electronic digitizer to create and capture and attach a digital signature;
    a digital web-camera or video device capturing both streaming and live streaming video;
    said user data input device is attached to a kiosk or on-line virtual kiosk software application at a location that is remote from a live network pre-registered Notary Public;
    said remote live pre-registered Notary Public connects via a secure real time network or network server secure communications link to a kiosk or on-line virtual kiosk software application over a network or network server with said user;
    said network or network server secured communication link deploys a signatory assessment screening survey requiring said user to answer questions and or provide information regarding their identity, volition, duress, and awareness to execute the signing of a legal document;
    if said signatory assessment screening survey determines that said user is not in compliance, said remote live pre-registered Notary Public can terminate said notarization;
    said network or network server secured communication link deploy encryption and embedding software that encrypts said user data and remote live pre-registered Notary Public data with an electronic algorithm using embeddable symbols and digitally embeds said embeddable symbols in electronic font lines generated by said data input device having an electronic digitizer to create, capture, attach, and electronically embed said embeddable symbols in an embedded digital signature;

said network or network server digitally attaches said user answer from said signatory assessment screening survey to said user electronic algorithm of embeddable symbols digitally embedded with said electronic font line digital signature whereby augmenting said digital signature for subsequent authentication and viability, and a receipt printer for printing a receipt for monetary payment of a transaction and a printer for printing a finalized electronic document.

2. The system for real-time remote electronic notarization according to claim 1 wherein said data input device further includes a terminal with a point of sale device with either a magnetic card reader or a data card reader.

3. The system for real-time remote electronic notarization according to claim 1 wherein said data input device that is connected to a kiosk or on-line virtual kiosk application is selected from the group consisting of a terminal with a biometric authorization parameter including a fingerprint reader, a retinal scanner, a facial recognition, a voice recognition device and a signature entry device.

4. The system for real-time remote electronic notarization according to claim 1 wherein said data input device that is connected to a kiosk or on-line virtual kiosk application is a terminal with manual user input capability of a keyboard, mouse, scanner, touch screen, signature pad, microphone, video, audio, camera, or trackball.

5. The system for real-time remote electronic notarization according to claim 1 wherein said data input device communicates with said network server with a cellular PDA, computer or phone having live streaming video, audio, communications between said kiosk, or on-line virtual kiosk application, and live said pre-registered notary.

6. The system for real-time remote electronic notarization according to claim 1 wherein said network server includes at least one of a back-up server or an archival system.

7. The system for real-time remote electronic notarization according to claim 1 wherein said network server includes a network security software.

8. The system for real-time remote electronic notarization according to claim 1 wherein a cryptographic identity is determined with a driver's license, bank card, photo identification, credit card, RFID chip, or military identification.

9. The system for real-time remote electronic notarization according to claim 1 wherein said communication link is over an internet, cellular phone, radio communication, microwave dish, cable line, or phone line.

10. The system for real-time remote electronic notarization according to claim 1 wherein said notary service authorizes notarized documents where more than one signatory is involved.

11. The system for real-time remote electronic notarization according to claim 1 wherein said notary service is for a loan, mortgage, deed, affidavit, jurat, E-apostilles, legal documents, trust, wills, assignment, voting or authorization.

12. The system for real-time remote electronic notarization according to claim 1 that further includes capability to forward a notarized document to a third party having a capability to decrypt and extrapolate said embeddable symbols from said electronic digital signature to validate and authenticate said electronic digital signature.

13. The system for real-time remote electronic notarization according to claim 1 wherein a notary journal is generated from said first and subsequent interface and said notary journal includes a sortable database to sort for signers, documents, and dates.

14. The system for real-time remote electronic notarization according to claim 1 wherein said data input device further includes an ability to affix a notaries public seal information data to notarized document.

15. The system for real-time remote electronic notarization according to claim 1 wherein said data input device includes an interface for a RFID device to verify and authenticate said user.

16. The system for real-time remote electronic notarization according to claim 1 that further includes a clearing house server that communicates to government authorities.

17. The system for real-time remote electronic notarization according to claim 1 wherein said at least three alphanumeric identifiers include a pre-registered cellular/PDA device or portable pc device identification number, a notary commission number, and an electronic notaries public seal information data.

* * * * *